United States Patent
Gombert

(10) Patent No.: US 7,555,530 B2
(45) Date of Patent: Jun. 30, 2009

(54) SYSTEMS AND METHODS FOR PROVIDING DOCUMENTS BASED ON DOCUMENT IDENTIFIERS

(75) Inventor: Barry G. Gombert, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 965 days.

(21) Appl. No.: 10/707,575

(22) Filed: Dec. 22, 2003

(65) Prior Publication Data

US 2005/0135850 A1 Jun. 23, 2005

(51) Int. Cl.
*G06F 15/16* (2006.01)
(52) U.S. Cl. ................... 709/217; 709/218; 709/219
(58) Field of Classification Search .......... 709/217–219
See application file for complete search history.

(56) References Cited

U.S. PATENT DOCUMENTS

| | | | |
|---|---|---|---|
| 6,470,268 B1* | 10/2002 | Ashcraft et al. .......... 701/209 |
| 6,736,322 B2* | 5/2004 | Gobburu et al. ........ 235/462.46 |
| 6,948,068 B2* | 9/2005 | Lawandy et al. ............ 713/176 |
| 7,051,086 B2* | 5/2006 | Rhoads et al. .............. 709/219 |
| 2001/0032251 A1* | 10/2001 | Rhoads et al. .............. 709/217 |
| 2001/0042075 A1* | 11/2001 | Tabuchi ...................... 707/500 |
| 2001/0054009 A1* | 12/2001 | Miller et al. ................... 705/26 |
| 2002/0143860 A1* | 10/2002 | Catan .......................... 709/203 |
| 2003/0019935 A1* | 1/2003 | Giannulli ............... 235/462.25 |
| 2003/0069977 A1* | 4/2003 | Heiden ........................ 709/227 |
| 2003/0089766 A1* | 5/2003 | Needham ..................... 235/375 |
| 2003/0124978 A1* | 7/2003 | Virtanen ........................ 455/41 |
| 2005/0149765 A1* | 7/2005 | Aldstadt et al. .............. 713/300 |

* cited by examiner

*Primary Examiner*—Dohm Chankong
*Assistant Examiner*—Brian P. Whipple
(74) *Attorney, Agent, or Firm*—Oliff & Berridge, PLC

(57) ABSTRACT

Systems and methods provide documents based on collected document identifiers. A document production center receives a document identifier along with delivery address information, identifies a digital document based on the document identifier, makes an copy or prints a hard copy of the document, and delivers the copied or printed document to a delivery address based on the delivery address information.

16 Claims, 3 Drawing Sheets

SYSTEMS AND METHODS FOR PROVIDING DOCUMENTS BASED ON DOCUMENT IDENTIFIERS

BACKGROUND OF THE INVENTION

1. Field of Invention

This invention relates to systems and methods for providing documents of an event, such as a tradeshow, based on document identifiers.

2. Description of Related Art

Businesses still distribute a great deal of printed documents, such as product information, at events, such as tradeshows and other marketing or industry events. There is a significant cost associated with providing printed documents for dissemination to potential customers. The documents must be created prior to an event, shipped to the event, and managed at the event. In addition, leftover printed documents need to be shipped from the event or disposed of.

Moreover, an event attendee has to bear the burden of carrying all printed documents that he or she is interested in, schlepping the printed documents from booth to booth during the event, to the hotel and/or airport after the event, and all the way back to his or her office.

SUMMARY OF THE INVENTION

This invention provides systems and methods for reducing the cost of disseminating printed documents for an event, such as tradeshows and other marketing or industry events.

In various exemplary embodiments, this invention provides systems and methods for event participants to up-load documents on-line into a repository for printing at a later time.

In various exemplary embodiments, this invention provides systems and methods for an event attendee to gather a collection of document identifiers during an event to receive printed documents at a later time.

In various exemplary embodiments, this invention provides systems and methods for an event attendee to collect document identifiers carried on a medium that is different from the medium by which the attendee submits the document identifiers to receive printed documents.

In various exemplary embodiments, this invention provides systems and methods for an event attendee to collect document identifiers in the form of tokens and subsequently to submit the tokens to receive bound hard copies of desired documents from the event.

In various exemplary embodiments, this invention provides systems and methods for disseminating document identifiers in the form of bar codes.

In various exemplary embodiments, this invention provides systems and methods for disseminating document identifiers in the form of business cards that contain a radio frequency identification (RFID), a data glyph or other printed code.

In various exemplary embodiments, this invention provides systems and methods for disseminating document identifiers used in infrared data association (IrDA) transfer to a personal data assistant (PDA), a cellular phone, a notebook computer, or a pocket personal computer (Pocket PC).

In various exemplary embodiments, this invention provides systems and methods for disseminating document identifiers in the form of smart badges or smart passes.

In various exemplary embodiments, this invention provides systems and methods for delivering printed documents to an address contained in an event attendee's profile information, registration badge or event attendee identification.

In various exemplary embodiments, the systems and methods according to this invention allow event participants to upload document digital data sets available for collection by event attendees. During the event, an event attendee selects and gathers document identifiers that relate to the available document digital data sets. Each document identifier references a particular document digital data set. The collected document identifiers may be submitted, along with the attendee's profile information, to a document production center to have the selected documents printed and delivered.

In various other exemplary embodiments, the systems and methods according to this invention allow an advertiser to place an advertisement identifier with the advertisement in a magazine. A reader collects the identifier and submits the identifier, along with the reader's information, to an information center for a printed document containing additional information regarding the advertisement and the advertised product or service.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Various exemplary embodiments of the systems and methods according to this invention provide printed documents based on document identifiers. The following description is based on, but not limited to, an event scenario. The systems and methods for providing printed documents based on document identifiers according to this invention may also be applied to providing printed documents based on document identifiers at marketing or industry events, or providing additional information in the form of printed documents regarding products or services introduced in advertisements in a magazine or other context.

Figure 1:
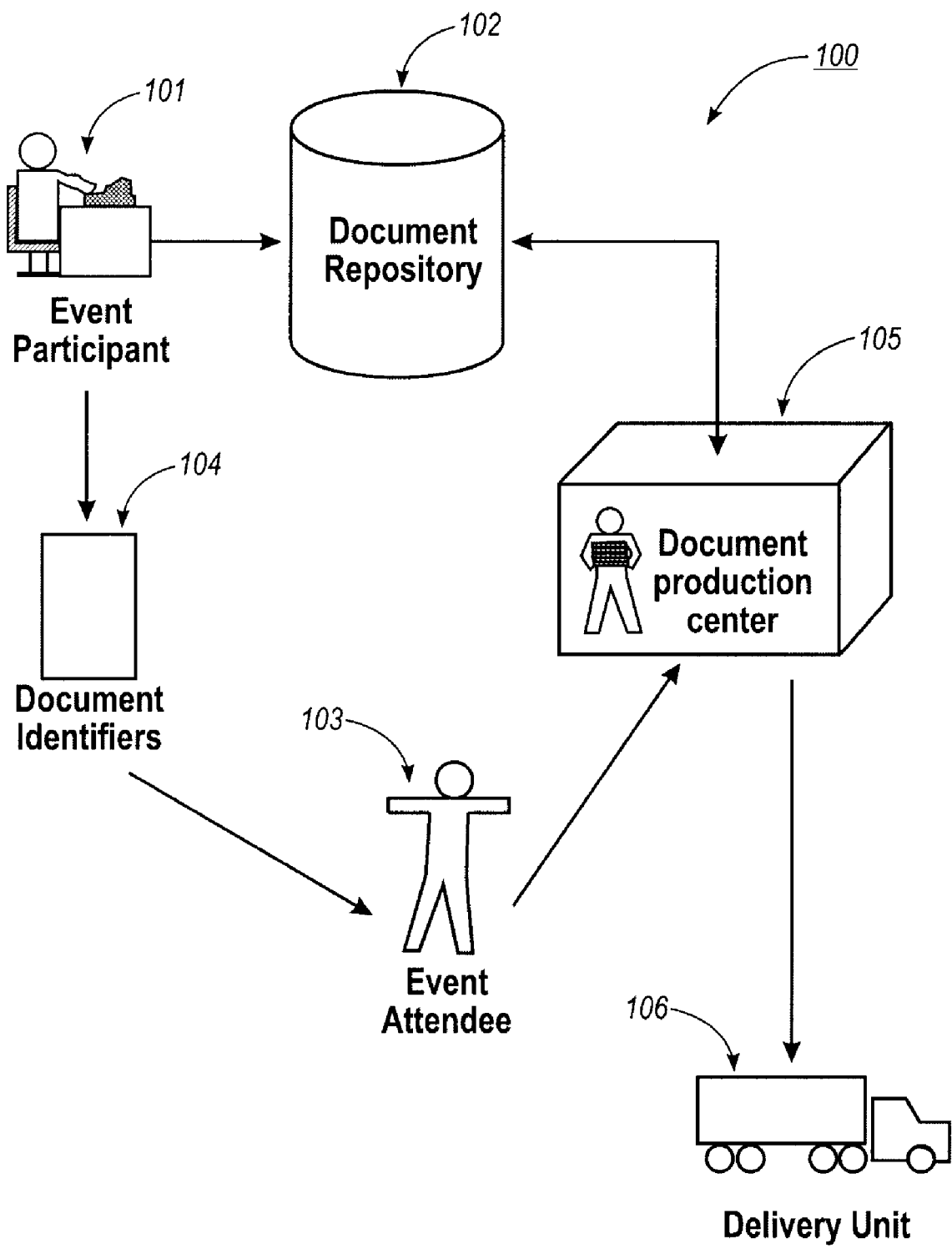
FIG. 1 illustrates a flow of printed documents at an event in an exemplary embodiment according to the present invention.

FIG. 1 illustrates a flow of printed documents at an event in an exemplary embodiment according to the present invention. As shown in FIG. 1, in an event 100, event participants 101 upload or store documents to a document repository 102. In various exemplary embodiments, the event participants are representatives of businesses promoting their products and/or services. In various exemplary embodiments, the event participants 101 present their products or services at different booths of the event.

In various exemplary embodiments, the document repository 102 is a digital device which stores the loaded copies of documents such as, for example, brochures and fliers, that introduce and promote the businesses' products and services.

In various exemplary embodiments, the documents are digital data sets, with each digital set identifiable by a unique document identifier, as discussed in greater detail below. In various exemplary embodiments, the loaded copies of documents are displayed.

In various exemplary embodiments, each event participant 101 uses a different document repository 102 to upload and store the documents related to the products or services of the business represented by the event participant 101. In various other exemplary embodiments, two or more event participants 101 share a document repository 102.

As shown in FIG. 1, event attendees 103 select and collect document identifier 104 from the event participant 101. In various exemplary embodiments, a document identifier is uniquely associated with a document in the document repository 102. In various exemplary embodiments, the document identifier 104 is implemented or carried on a medium that is different from the medium on which the document at the repository 102 is stored or displayed. For example, while the document may be displayed on a computer screen, the document identifier 104 may be carried on a piece of plastic. In various exemplary embodiments, a document identifier 104 is in the form of a token, such as a chip containing readable or scan-able information, such as a data glyph or other printed code, such as bar code. In various exemplary embodiments, a document identifier 104 is in the form of a radio frequency identification (RFID). In various other exemplary embodiments, the document identifier 104 is in the form of a business card that contains a data glyph or other printed code, such as bar code. In various other exemplary embodiments, the document identifier 104 is in the form of a smart badge or a smart pass. In various other exemplary embodiments, the document identifier 104 is in the form of an infrared data association (IrDA) that can be transferred to a personal data assistant (PDA), a cellular phone, a notebook computer, or a pocket personal computer (Pocket PC).

In various exemplary embodiments, the event attendee 103 selects document identifiers 104 by viewing the loaded copies of the documents that are displayed at the event participants 101. In various exemplary embodiments, the event attendee 103 collects the selected document identifiers 104 by personal interaction, such as, for example, by receiving the selected document identifiers 104 handed from the event participants 101, or by manually picking up the document identifiers 104 from a table, a box, a shelf, or the like.

In various exemplary embodiments, the event attendee 103 collects document identifiers 104 in the form of business cards that contain a data glyph or other printed codes associated with documents. In various other exemplary embodiments, the event attendee receives the document identifier 104 in the form of an infrared data association that may be transferred to a personal data assistant, a cellular phone, a notebook computer, or a pocket personal computer of the attendee. In various other exemplary embodiments, the event attendee is equipped with a scanner that scans smart badges or smart passes that identify documents and receives the document identifier 104 by scanning the smart badges or smart passes.

In various exemplary embodiments, the event attendee 103 has an event registration badge which contains the event attendee's profile information. In various exemplary embodiments, the profile information contains delivery information, such as an e-mail address, facsimile number or postal address, for receiving printed or electronic documents. In various exemplary embodiments, the profile information is in the form of a bar code or a data glyph. In various exemplary embodiments, the profile information is in the form of a radio frequency identification (RFID).

In various exemplary embodiments, after an event attendee 103 visits different event participants 101, views displayed digital documents stored at the document repository 102, and collects document identifiers associated with the documents that are of interest to the event attendee, the attendee submits the collected document identifiers, possibly along with the attendee's profile information to a document production center 105 to receive printed copies of the documents corresponding to the collected document identifiers. In various exemplary embodiments, the document production center 105 is located at a different geo-location from where the event participants 101 are located. In various exemplary embodiments, the event attendee 103 submits the collected document identifiers 104 by personal interaction, such as, for example, by handing the collected document identifiers 104 to a person at the distribution center 105, or by manually delivering the collected document identifiers 104 to a table, a box, a shelf, or the like, at the distribution center 105.

In various exemplary embodiments, the document production center 105 receives collected document identifiers along with the profile information of the event attendee. In various exemplary embodiments, the document production center 105 obtains document information from tokens, scans document information from business cards that contain a radio frequency identification (RFID), a data glyphs or other printed codes, detects document information from smart badges or smart passes, or receives document information from infrared data association (IrDA) transferred from a personal data assistant (PDA), a cellular phone, a notebook computer, or a pocket personal computer (Pocket PC).

In various exemplary embodiments, the document production center 105 is located at or near an exit of the event for submission of collected document identifiers, and possibly also event attendees' profile information. In various other exemplary embodiments, the document production center 105 is located at a place other than the locale of the event. In such exemplary embodiments, event attendees submit document identifiers and event attendees' profile information at a later time after the event to receive electronic copies or printed copies of the documents.

In various exemplary embodiments, each document is displayed by an event participant or at a booth with a device that is capable of receiving the profile information of an event attendee. In various exemplary embodiments, an event attendee, when visiting an event participant, scans his or her event registration badge into a display device where a document of his or her interest is being displayed. For example, the event attendee may scan his or her event registration badge at a scanner that is associated with a document. The event attendee may also have the event participant scan the attendee's event registration badge at the scanner that is associated with the document. In such exemplary embodiments, the document of the event attendee's interest and the event attendee's event registration badge information are automatically submitted to the document production center 105 to print the desired document for the event attendee.

As shown in FIG. 1, the document production center 105 receives and/or stores the available documents uploaded to the document repository 102. Upon receiving a collected document identifier and the profile information of an event attendee, in various exemplary embodiments, the document production center 105 identifies the document associated with the collected document identifier, and makes a copy of the identified document available for the event attendee. In various exemplary embodiments, the copy of the document is printed and delivered by a delivery unit 106 to the event attendee at an address indicated in the event attendee's profile information. In various other exemplary embodiments, the copy of the document is transferred electronically to the event attendee at, for example, an e-mail address of the event attendee indicated in the event attendee's profile information.

In various exemplary embodiments, the medium on which the document production center 105 receives the collected documents identifiers 104 is different from the medium on which the document identifiers 104 are implemented or carried. For example, while the document identifier 104 may be carried on a piece of plastic or other material in the form of a token, a business card or a smart badge, the document production center 105 may receive the collected documents identifiers by scanning the plastic or other material with a scanner. In various exemplary embodiments, the medium on which the document production center 105 receives the collected document identifiers 104 is different from the medium on which the available documents are displayed at a booth of an event participant 101. For example, while the document production center 105 may receive the collected documents identifiers from a scannable substrate via a scanner, the document may be displayed on a computer screen at a booth of the event.

Figure 2:
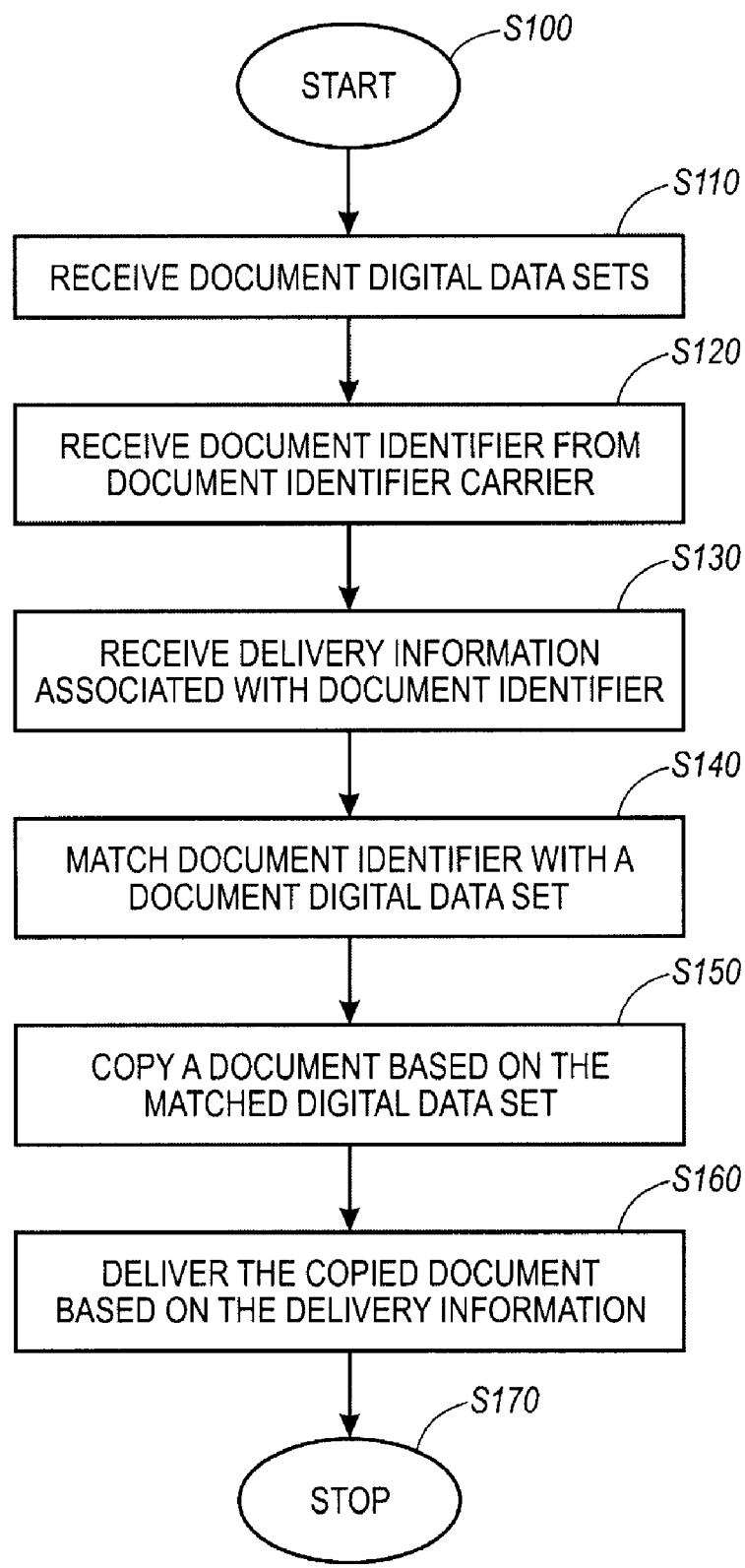
FIG. 2 is a flowchart outlining an exemplary embodiment of a method for providing documents based on document identifiers according to the present invention.

FIG. 2 is a flowchart outlining an exemplary embodiment of a method for providing documents based on document identifiers. As shown in FIG. 2, beginning in step S100, operation of the method continues to step S110, where a document production center receives or stores document digital data sets, such as digital data sets for tradeshow brochures or the like. Next, in step S120, the document production center receives a collected document identifier from a document identifier carrier, such as a token. Then, in step S130, the document production center receives delivery information contained in profile information associated with the document identifier. In various exemplary embodiments, the order in which steps S110, S120 and S130 occur is not material, as long as the document production center receives all information indicated in steps S110, S120 and S130 that is necessary for the particular implementation.

Next, in step S140, the document production center identifies a document digital data set from the stored document digital data sets by matching the appropriate document identifier with the document digital data set. Then, in step S150, the document production center makes a copy of the identified document available for the party who submitted the document identifier, such as an event attendee, indicated in the received delivery information. The copy of the document may be in the form of a printed hard copy or an electronic document, for example.

Next, in step S160, the document production center delivers the copy of the document to the party by, for example, shipping a printed hard copy of the document to an address based on the delivery information, or by transmitting the electronic document to an e-mail address or facsimile number based on the delivery information. Operation then continues to step S170, where operation of the method ends.

Figure 3:
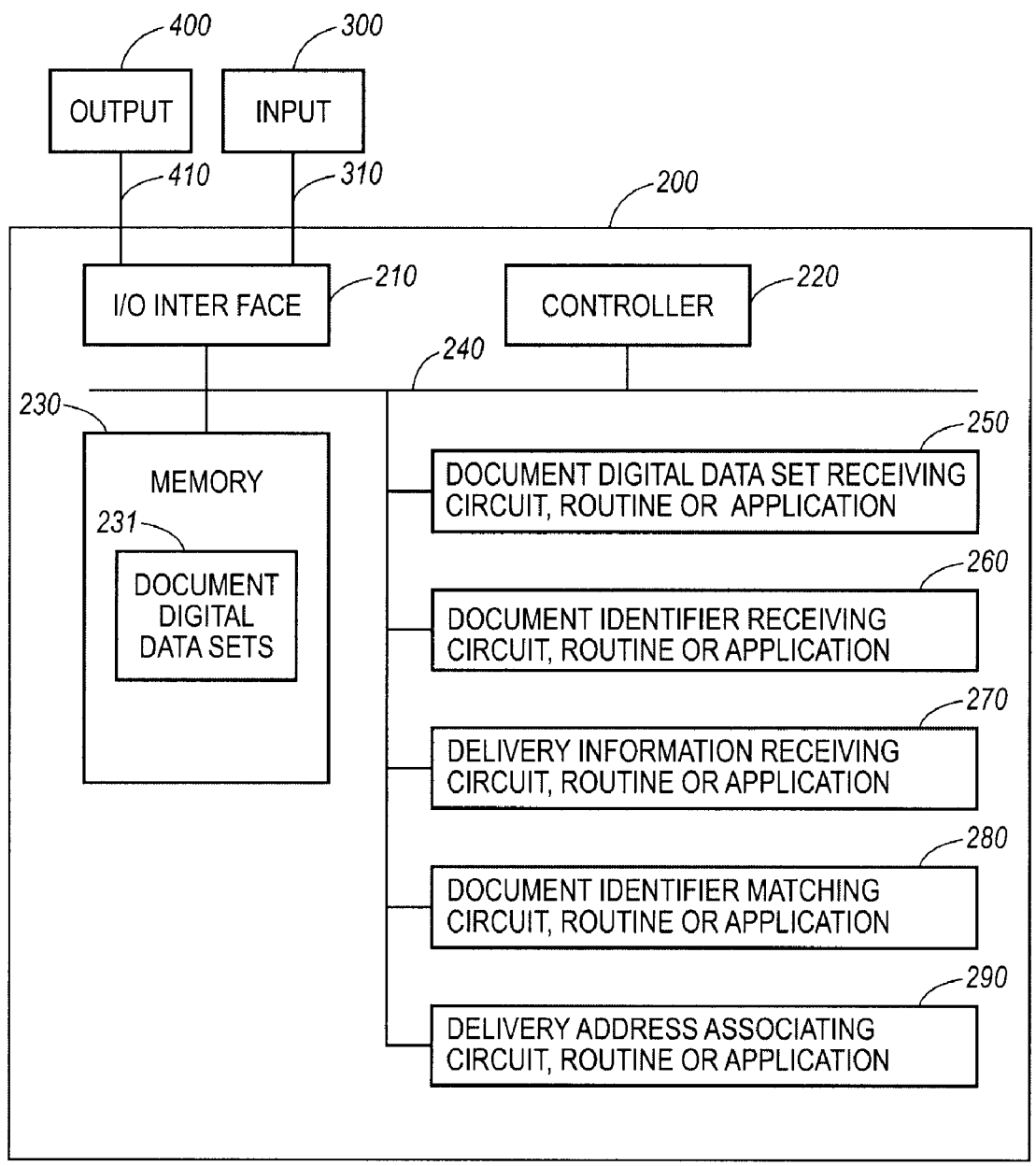
FIG. 3 is a functional block diagram of an exemplary embodiment of a document distribution system according to the present invention.

FIG. 3 is a functional block diagram of an exemplary embodiment of a document distribution center according to this image. As shown in FIG. 3, the document distribution system 200 includes an input/output (I/O) interface 210, a controller 220, a memory 230, a document digital data set receiving circuit, routine or application 250, a document identifier receiving circuit, routine or application 260, a delivery information receiving circuit, routine or application 270, a document identifier matching circuit, routine or application 280 and a delivery address associating circuit, routine or application 290, each interconnected by one or more control and/or data buses and/or application programming interfaces 240.

As shown in FIG. 3, the document distribution system 200, in various exemplary embodiments, is implemented on a programmable general purpose computer. However, the system 200 can also be implemented on a special purpose computer, a programmed micro processor or micro controller and peripheral integrated circuit elements, an ASIC or other integrated circuits, a digital signal processor (DSP), a hard wired electronic or logic circuit, such as a discrete element circuit, a programmable logic device such as a PLD, PLA, FPGA or PAL, or the like. In general, any device capable of implementing a finite state machine that is in turn capable of implementing the flowchart shown in FIG. 2 can be used to implement the document distribution system 200.

The input/output interface 210 interacts with the outside of the document distribution system 200. In various exemplary embodiments, the input/output interface 210 may receive input from one or more input devices 300 connected with the input/output interface 210 via one or more links 310. The input/output interface 210 may output an electronic copy of an identified document or document for printing and subsequent delivery, or for electronic transmission via one or more links 410. The one or more input devices 300 may be a scanner, a sensor or a detector that can read information embedded in data glyphs, bar codes, infrared data association, smart badges or the like, or receive signals from a radio frequency identification (RFID). The output 400 may be a printer, a display screen, or an Internet connection that can make a copy of the document available to the party.

The links 310 and 410 can be direct connections, or can be implemented using a connection device such as a modem, a local area network, a wide area network, an intranet, the Internet, and any other distributed processing network, or any other known or later-developed connection device.

As shown in FIG. 3, the memory 230 includes a document digital data set portion 231. The document digital data set portion 231 stores digital documents for an event, such as a tradeshow. The memory 230 may also store any data and/or program necessary for implementing the functions of the document distribution system 200. The memory 230 can be implemented using any appropriate combination of alterable, volatile, or non-volatile memory or non-alterable or fixed memory. The alterable memory, whether volatile or non-volatile, can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or a DVD-ROM disk and disk drive or the like.

In the exemplary embodiment of the document distribution system 200 shown in FIG. 3, the document digital data set receiving circuit, routine or application 250 receives documents. The document identifier receiving circuit, routine or application 260 receives collected document identifiers from a party, such as an event attendee. The delivery information receiving circuit, routine or application 270 receives delivery information of a party, such as an event attendee.

In various exemplary embodiments, the delivery information of the event attendee is contained in profile information of the event attendee. The profile information may be imbedded in the event attendee's event badge. For example, when registering for the event, an event attendee obtains the event badge that contains the event attendee's e-mail address, facsimile number and/or postal address in printed form or in the form of a magnetic strip or other printed code, such as a bar code, and possibly other identifying information of the event attendee. In various other exemplary embodiments, the delivery information of the event attendee is not pre-stored, but is made available when, for example, the event attendee fills in a delivery information form when submitting collected document identifiers.

The document identifier matching circuit, routine or application 280 identifies a document digital data set from the document digital data sets stored in the document digital data set portion 231 by matching the document identifier with the document digital data set. The delivery address associating circuit, routine or application 290 associates the identified document digital data set with an address for delivery based on the delivery information.

In operation of the exemplary embodiments of the document distribution system 200, the input/output interface 210, under control of the controller 220, receives inputs from the one or more input devices 300, including document digital data sets, collected document identifiers, and delivery information. The document digital data set receiving circuit, routine or application 250, under control of the controller 220, stores the document digital data sets in the memory 230. The document identifier receiving circuit, routine or application 260, under control of the controller 220, analyzes the collected document identifiers and, if necessary, decodes the collected document identifiers. The delivery information receiving circuit, routine or application 270, under control of the controller 220, analyzes the delivery information. In various exemplary embodiments, the delivery information receiving circuit, routine or application 270 decodes or extracts the delivery information from a party's profile information before analyzing the delivery information.

In some embodiments, the delivery information receiving circuit, routine or application 270, the document identifier matching circuit, routine or application 280 and/or the delivery address associating circuit, routine or application 290 may be omitted. For example, in response to receiving a document identifier, the document distribution system 200 may directly output the corresponding document to a local printer or recording device to be printed or copied to a magnetic optical or other recording medium. The printed document or the storage medium may then be given directly to the event attendee when, for example, the attendee is leaving the event location.

The document identifier matching circuit, routine or application 280, under control of the controller 220, identifies a document digital data set from the memory 230 that matches the collected document identifier. The delivery address associating circuit, routine or application 290, under control of the controller 220, associates the identified document or document with a delivery address based on the delivery information. The input/output interface 210, under control of the controller 220, then outputs the identified document/document for printing and delivery or for electronic transmission to the delivery address.

While particular embodiments have been described, alternatives, modifications, variations and improvements may be implemented within the spirit and scope of the invention.

The invention claimed is:

1. A method for providing a copy of a document, comprising:

storing or uploading at least one of a plurality of documents in at least one of a plurality of document repositories;

collecting a plurality of document identifiers on a first medium;

receiving and storing in a memory on a second medium the plurality of collected document identifiers, and a user identifier identifying a unique user;

associating each document identifier with at least one of the plurality of documents stored in at least one of the plurality of document repositories, the document repositories different from the first and second media;

linking the second medium with at least one of the document repositories;

identifying a stored document as an identified document if any of the document identifiers correspond to a document stored in the document repositories linked to the second medium; and copying the identified document to a third medium.

2. The method of claim 1, further comprising:

receiving on the second medium an address identifier associated with the user identifier; and delivering the identified document to an address indicated by the address identifier.

3. The method of claim 2, wherein the address identifier is in a form of a printed code, and receiving the address identifier comprises scanning the address identifier from the printed code.

4. The method of claim 3, wherein scanning the address identifier comprises scanning the address identifier from an event registration badge.

5. The method of claim 2, wherein the address identifier is in a form of a radio frequency identification, and receiving the address identifier comprises receiving the radio frequency identification.

6. The method of claim 1, further comprising:

collecting the document identifier based on a display of a copy of a printed or digital document, wherein the copy of the printed or digital document is displayed on a fourth medium, the fourth medium different from the first, second and third media.

7. The method of claim 1, wherein collecting the document identifier comprises scanning or sensing the document identifier.

8. The method of claim 1, wherein the document identifier is in a form of a data glyph contained on a business card, and collecting the document identifier comprises reading the data glyph from the business card.

9. The method of claim 1, wherein the document identifier is in a form of a bar code, and collecting the document identifier comprises scanning the bar code.

10. The method of claim 1, wherein the document identifier is in a form of an infrared data association, and collecting the document identifier comprises transferring the infrared data association from a portable device.

11. The method of claim 10, wherein the portable device is one of a personal data assistant, a cellular phone, a notebook computer, or a pocket personal computer.

12. The method of claim 1, wherein the document identifier is in a form of a smart badge, and collecting the document identifier comprises sensing the document identifier from the smart badge.

13. The method of claim 1, wherein the document identifier is in a form of a token, and collecting the document identifier comprises collecting the document identifier from the token.

14. The method of claim 1, wherein the document identifier is in a form of radio frequency identification, and collecting the document identifier comprises receiving the radio frequency identification.

15. A system for providing a copy of a document, comprising:
- a database storing document digital data sets associated with document identifiers;
- a medium that collects a plurality of document identifiers;
- a document identifier receiving circuit, routine or application that receives and stores in a memory the collected document identifiers, a user identifier identifying a unique user, the document identifiers associated with at least one of a plurality of documents stored in or uploaded to at least one of a plurality of document repositories, at least one of the document repositories being linked to the document identifier receiving circuit,
- a delivery information receiving circuit, routine or application that receives delivery information from at least one of the document repositories, the user information comprising the delivery information;
- a document identifier matching circuit, routine or application that identifies a document digital data set from among the stored document digital data sets which is associated with each document identifier stored in the document identifier receiving circuit as an identified document if any of the document identifiers correspond to any of the plurality of documents stored in the document repositories linked to the document identifier receiving circuit; and
- one or more of (a) an output device that outputs a copy of the identified document, and (b) a delivery address associating circuit, routine or application that associates the identified document digital data set to a delivery address based on the delivery information for delivering a copy of the identified document to the delivery address.

16. The system of claim 15, wherein the document identifier is carried on a first medium that is distinct from a second medium on which the document identifier receiving circuit, routine or application is provided.

* * * * *